Dec. 29, 1931.  H. D. GEYER ET AL  1,839,093
DEVICE FOR TESTING HARDNESS OF RUBBER
Filed June 7, 1928

Inventors
Harvey D. Geyer
Edward J. Dill
By Spencer Hardman & Fehr
their Attorneys Patented Dec. 29, 1931

1,839,093

UNITED STATES PATENT OFFICE

HARVEY D. GEYER AND EDWARD J. DILL, OF DAYTON, OHIO, ASSIGNORS TO THE INLAND MANUFACTURING CO., OF DAYTON, OHIO, A CORPORATION OF DELAWARE

DEVICE FOR TESTING HARDNESS OF RUBBER

Application filed June 7, 1928. Serial No. 283,622.

This invention relates to an instrument for testing the hardness of rubber or other elastic materials.

An object of this invention is to provide a hardness testing instrument involving improvements on the testing device described in Patent #1,483,565 to Adams.

This Adams' instrument is adapted to be held in the hand of the inspector and be pressed directly against the surface of the material being tested with a force sufficient to cause the movable plunger to embed itself in the tested material until the tested material engages the abutment adjacent said plunger. The dial reading measuring the distance said plunger embeds within the tested material is taken as an index to the material hardness. It is found that different inspectors using Adams' device will not obtain the same hardness results for the same test piece due to the difference in force with which they press the device upon the test piece. In other words, Adams' devices depends for accuracy to some extent upon the inspector exerting the correct hand pressure which has to be merely guessed at.

A feature of the present invention is that it does away with this human element which makes for inaccuracy of the results by providing that the plunger is pressed upon the tested material with an exact predetermined force. Thus the accuracy of the test is unaffected by different inspectors making the test.

Further objects and advantages of the present invention will be apparent from the following description, a reference being had to the accompanying drawings, wherein a preferred embodiment of one form of the present invention is clearly shown.

In the drawings.

Similar reference characters refer to similar parts throughout the drawings.

Figure 1:
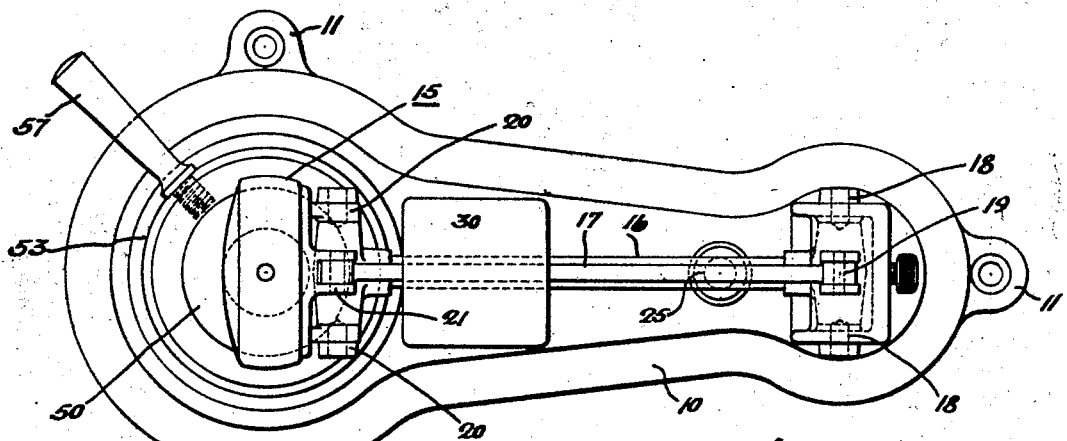
Fig. 1 is a top view of an instrument made according to this invention.

Numeral 10 designates a cast base which is adapted to be fixed solidly to a table or other support by screws extending through legs 11. A rigid casing 15 is supported by a standard 12 through a parallelogram lever arrangement comprising the levers 16 and 17. Levers 16 and 17 are pivoted to the standard 12 at pivot points 18 and 19 respectively, which points are vertically aligned. Levers 16 and 17 are of the same length and are pivoted to casing 15 at the vertically aligned pivots 20 and 21 respectively. Therefore casing 15 will always maintain its directly vertical position when it is raised or lowered from the position shown in Fig. 2. An adjustable stop screw 25, which is supported by standard 12 through the small bracket 26, contacts with lever 16 and so normally supports the weight of all the parts supported by levers 16 and 17, as is clear from Fig. 2. A weight 30 is adjustably fixed to lever 16 by the set screw 31 and has a hole 32 therethrough providing proper clearance for the relative movement of lever 17 without contacting with said weight.

Now casing 15 has a flat surface 40 on its lower portion against which the test piece 35 is pressed upwardly by means described below. A spring pressed plunger is mounted within casing 15 having its lower end 41 projecting through an aperture in the center of the flat abutment 40 (see Fig. 2). When test piece 35 is moved upward, it first engages the plunger point 41 which is thereby forced upward to some extent depending upon the hardness of the material of the test piece and upon the strength of the spring which urges plunger 41 downward. The upward movement of plunger 41 relative to the abutment 40 of casing 15 will therefore be an index of the hardness of test piece 35 when the test piece is forced upwardly thereagainst with a predetermined force. Such predetermined force is obtained by lifting the lever 16 from its contact with the stop screw 25. For instance, the position of weight 30 may be so adjusted that when lever 16 is lifted from its stop 25 by the upward movement of test piece 35 an upward force of exactly one kilogram will be exerted against the test piece. This kilogram of force will be partly exerted against the abutment 40 of casing 15 and partly against the plunger 41, the force exerted against the plunger 41 depending upon the hardness of the test piece as stated above. The upward movement of plunger 41 relative to the abutment 40 is preferably measured by a rotating hand 42 and a dial on the face of casing 15 in a manner which is well known in many instruments and hence is not described in detail herein. This casing 15 and all the parts contained therein is preferably made according to the disclosure in the above mentioned Patent #1,483,565 to Adams, in fact one of the Adams' hand instruments may be purchased on the open market and applied to the instrument of this invention simply by fitting suitable brackets thereto for the pivots 20 and 21. As stated above, the chief feature of this invention is the means providing that the test piece be forced against the plunger 41 and abutment 40 with a constant predetermined force, such as the one kilogram of force in the case above described. Of course when the test piece is of such hardness that the kilogram of force is not sufficient to cause the test piece to contact with the abutment 40 a greater predetermined weight than one kilogram should be used in order that the instrument reading give an index of the hardness of the material. It is obvious that this instrument will give comparative hardness indexes for various test pieces only when the weight on lever 16 remains constant.

Any suitable means may be provided for lifting the test piece 35 sufficiently high to lift lever 16 from contact with stop 25. In the form chosen for illustration there is shown an anvil 50 which is reciprocatably mounted upon a stationary anvil support 51 fixed to the base 10. The lower portion 55 of support 51 is of increased diameter and has a double spiral cam groove 52, 52 therein. A ring member 53 telescopes upon the enlarged portion 55 and has two opposed inwardly projecting lugs 56 which engages the cam grooves 52, 52 and thereby cause ring 53 to rise or fall when rotated by means of a suitable handle 57. The reciprocating anvil member 50 rides upon the ring member 53 on the ball bearings 60 provided for the purpose of reducing friction. Anvil 50 is prevented from rotating by the screw lug 61 whose inner end slides within the vertical groove 62 provided therefor in fixed support 51. The pitch of the cam grooves 52 is preferably such that when handle 57 is rotated through 180 degrees the anvil 50 will be raised or lowered the full distance necessary to cause the test piece 35 laid thereupon to engage the contacts 41 and 40 and lift lever 16 from stop 25.

It will now be clear that the operator of this instrument may very rapidly test the hardness of a large number of rubber articles simply by laying each article upon anvil 50 with one hand, rotating lever 57 through 180 degrees with the other hand, and observing the indicator hand on the dial in the face of casing 15. The accuracy of the test will not be affected by the speed at which the inspector works since exactly the same pressure is exerted upon each article 35 so long as the lever 16 is lifted from its stop 25, as described above. This instrument is especially adapted for use in inspecting at the factory the hardness or cure of a large output of soft rubber articles of the same dimensions at one time.

Figure 2:
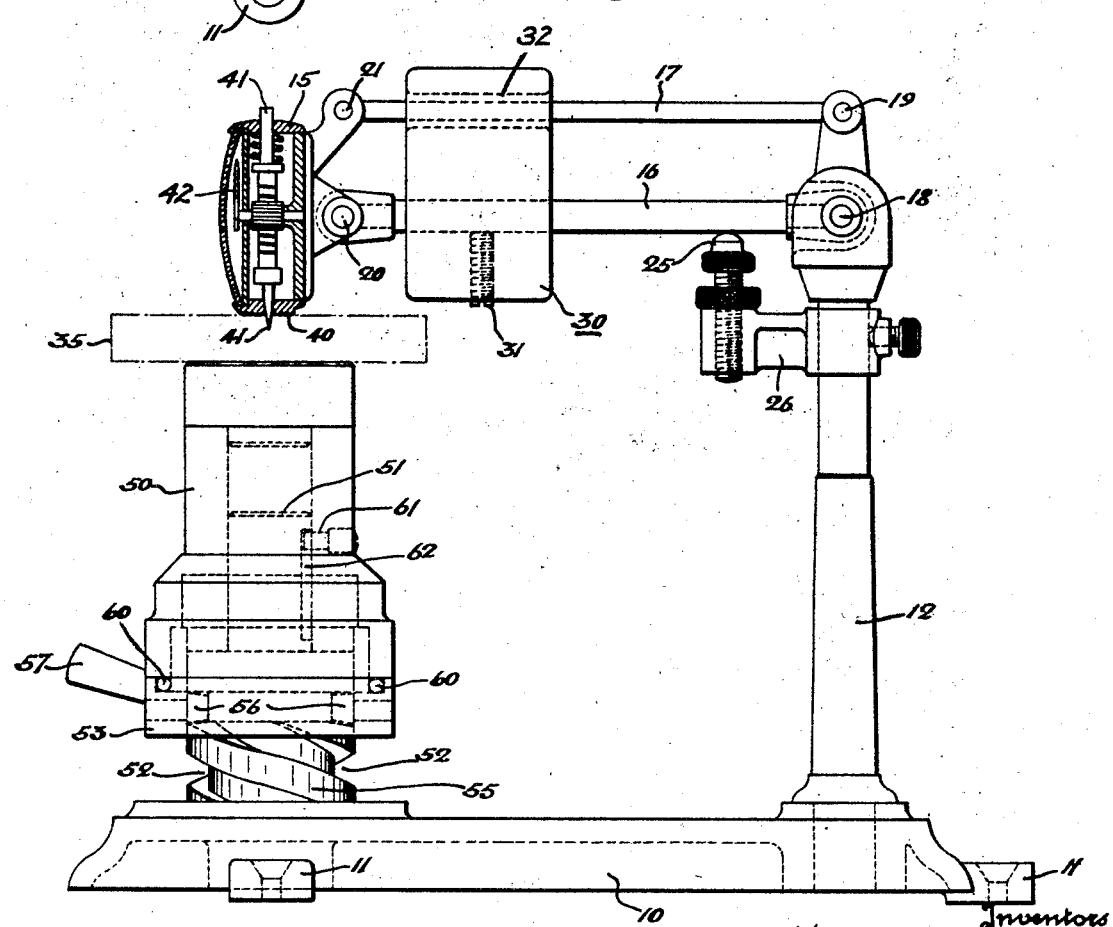
Fig. 2 is a side elevation thereof.

The clearance space between the top of anvil 50 and the plunger 41 may be suitably adjusted for the dimension of the articles to be tested by the vertical adjustment of stop screw 25, as will be clear from Fig. 2. Due to the parallelogram lever arrangement the casing 15 will always be maintained in correct vertical position and therefore there will be no possibility of error in the test due to any angularity between the surface of the article being tested and abutment surface 40.

While the form of embodiment of the present invention as herein disclosed, constitutes a preferred form, it is to be understood that other forms might be adopted, all coming within the scope of the claims which follow.

What is claimed is as follows:

1. A device for testing hardness of yielding materials such as rubber comprising: a casing having an abutment to engage the piece to be tested, a spring pressed plunger mounted in said casing and projecting a short distance thru an aperture in said abutment to engage said test piece and to be urged inwardly when the test piece is forced thereagainst, a movable weighted arm supporting said casing and a stop upon which it normally rests, means for forcing the test piece upwardly against said plunger and abutment until said weighted arm is lifted from said stop, and means for indicating the inward movement of said plunger relative to said abutment.

2. A device for testing hardness of yielding materials such as rubber comprising: a casing having an abutment to engage a piece to be tested, a spring pressed plunger mounted in said casing and projecting a short distance thru an aperture in said abutment to engage said test piece and to be urged inwardly when the test piece is forced thereagainst, a pivoted lever supporting said casing, a stop for said lever, an adjustable weight on said lever and normally holding said lever down upon said stop by gravity, means for forcing the test piece upwardly against said plunger and abutment until said lever is lifted from said stop whereby a predetermined force is applied to said test piece, and means for indicating the inward movement of said plunger relative to said abutment as an index of the hardness of the test piece.

In testimony whereof we hereto affix our signatures.

HARVEY D. GEYER.
EDWARD J. DILL.